(12) United States Patent
Burkhardt et al.

(10) Patent No.: US 10,207,381 B2
(45) Date of Patent: *Feb. 19, 2019

(54) MACHINE TOOL HAVING A NUMBER OF MULTISPINDLE SPINDLE ASSEMBLIES

(71) Applicant: Alfing Kessler Sondermaschinen GmbH, Aalen (DE)

(72) Inventors: Rainer Burkhardt, Aalen (DE); Hans Feifel, Aalen (DE); Markus Goggerle, Tannhausen (DE); Ulrich Heiermann, Plochingen (DE); Manfred Krieger, Iggingen (DE); Ulrich Straub, Sussen (DE)

(73) Assignee: ALFING KESSLER SONDERMASCHINEN GMBH, Aalen (DE)

( * ) Notice: Subject to any disclaimer, the term of this patent is extended or adjusted under 35 U.S.C. 154(b) by 188 days.

This patent is subject to a terminal disclaimer.

(21) Appl. No.: 14/908,183

(22) PCT Filed: Jul. 1, 2014

(86) PCT No.: PCT/EP2014/001801
§ 371 (c)(1),
(2) Date: Jan. 28, 2016

(87) PCT Pub. No.: WO2015/014428
PCT Pub. Date: Feb. 5, 2015

(65) Prior Publication Data
US 2016/0167187 A1    Jun. 16, 2016

(30) Foreign Application Priority Data

Jul. 29, 2013 (DE) .......................... 10 2013 013 050

(51) Int. Cl.
*B23Q 3/157* (2006.01)
*B23Q 11/08* (2006.01)
(Continued)

(52) U.S. Cl.
CPC .......... *B23Q 39/028* (2013.01); *B23B 39/161* (2013.01); *B23C 1/04* (2013.01);
(Continued)

(58) Field of Classification Search
CPC . B23Q 3/15786; B23Q 3/155–3/15793; B23Q 2039/006; B23Q 1/66;
(Continued)

(56) References Cited

U.S. PATENT DOCUMENTS 3,203,071 A * 8/1965 Uchida .................. B23B 39/02
29/26 R
3,977,804 A * 8/1976 Kitagawa ................ B23B 39/16
408/16
(Continued)

FOREIGN PATENT DOCUMENTS

DE    102005028358    12/2006
EP    2246136    11/2010
(Continued)

*Primary Examiner* — Erica E Cadugan
(74) *Attorney, Agent, or Firm* — Hoffmann & Baron, LLP

(57) ABSTRACT

A machine tool for machining workpieces, wherein the machine tool has a first spindle assembly and at least one second spindle assembly each having at least two working spindles which are arranged in a common spindle housing and on which in each case a machining tool for workpiece machining is arrangeable, wherein the machine tool has a workpiece holding device for holding workpieces for the purpose of workpiece machining by way of the machining tools, wherein the machine tool has a guide arrangement for the relative positioning of the workpiece holding device (Continued)

holding the workpieces and the first and the at least one second spindle assembly for workpiece machining.

18 Claims, 5 Drawing Sheets

(51) Int. Cl.
*B23Q 1/48* (2006.01)
*B23Q 7/04* (2006.01)
*B23Q 39/02* (2006.01)
*B23C 1/04* (2006.01)
*B23B 39/18* (2006.01)
*B23Q 1/01* (2006.01)
*B23B 39/16* (2006.01)
*B23Q 1/62* (2006.01)
*B23Q 3/155* (2006.01)
*B23Q 39/00* (2006.01)

(52) U.S. Cl.
CPC .............. *B23Q 1/012* (2013.01); *B23Q 1/015* (2013.01); *B23Q 1/623* (2013.01); *B23Q 3/155* (2013.01); *B23Q 3/15786* (2013.01); *B23Q 7/04* (2013.01); *B23Q 7/046* (2013.01); *B23Q 7/047* (2013.01); *B23Q 11/08* (2013.01); *B23Q 39/022* (2013.01); *B23Q 39/024* (2013.01); *B23C 2215/245* (2013.01); *B23Q 2039/006* (2013.01); *Y10S 408/707* (2013.01); *Y10T 408/385* (2015.01); *Y10T 409/305824* (2015.01); *Y10T 409/307168* (2015.01); *Y10T 483/115* (2015.01); *Y10T 483/16* (2015.01); *Y10T 483/1795* (2015.01)

(58) Field of Classification Search
CPC ........ B23Q 1/4857; B23Q 1/623; B23C 1/04; B23C 1/08; B23C 1/10; B23B 39/161; B23B 39/16–39/24; Y10T 409/305264; Y10T 409/30532; Y10T 409/305376; Y10T 409/305432; Y10T 409/307168; Y10T 409/307784; Y10T 409/308344; Y10T 409/308568; Y10T 408/36–408/385; Y10T 409/305824; Y10T 409/30896
USPC ....... 409/158–161, 192, 203, 213, 217, 168, 409/224; 408/31–53
See application file for complete search history.

(56) References Cited

U.S. PATENT DOCUMENTS

| | | | |
|---|---|---|---|
| 4,915,569 A | | 4/1990 | Cherko |
| 6,203,478 B1 * | | 3/2001 | Gorrochategui ...... B23B 39/161 408/236 |
| 6,298,531 B1 * | | 10/2001 | Baumbusch ........... B23Q 1/015 29/36 |
| 6,682,276 B2 * | | 1/2004 | Harami ................ B23Q 1/4857 160/202 |
| 9,914,189 B2 * | | 3/2018 | Burkhardt ................ B23Q 1/66 |
| 2006/0269375 A1 | | 11/2006 | Takayama et al. |
| 2006/0287174 A1 | | 12/2006 | Hansch et al. |
| 2007/0015646 A1 * | | 1/2007 | Prust ...................... B23Q 7/045 483/1 |
| 2007/0087924 A1 * | | 4/2007 | Krosta ................. B23Q 3/1554 483/1 |
| 2014/0373352 A1 * | | 12/2014 | Lazcano .............. B23Q 39/024 29/888.09 |
| 2017/0113311 A1 * | | 4/2017 | Ibarra ................... B23Q 1/623 |

FOREIGN PATENT DOCUMENTS

WO    WO2010088181    8/2010
WO    WO-2012/156541 A1 *    11/2012

* cited by examiner

MACHINE TOOL HAVING A NUMBER OF MULTISPINDLE SPINDLE ASSEMBLIES

This application claims priority based on an International Application filed under the Patent Cooperation Treaty, PCT/EP2014/001801, filed Jul. 1, 2014, which claims priority to DE102013013050.6, filed Jul. 29, 2013.

BACKGROUND OF THE INVENTION

The invention relates to a machine tool for machining workpieces, wherein the machine tool comprises a first spindle assembly and at least one second spindle assembly, each having at least two working spindles which are arranged in a common spindle housing and on each of which a machining tool for workpiece machining can be arranged, wherein the machine tool comprises a work holding device for holding workpieces for workpiece machining by means of the machining tools, wherein the machine tool comprises a guide arrangement for the relative positioning of the work holding device holding the workpieces and of the first and the at least one second spindle assembly for workpiece machining.

A machine tool known from DE 10 2005 028 358 A1 is equipped with a tool changing device, for example with a laterally located tool magazine, which is fitted with machining tools by a working robot. A work holder placed in front of a spindle assembly, the working spindles of which are arranged vertically on top of one another, holds the workpieces during the machining process. The known machine tool is a multi-spindle machine tool.

However, the known machine tool has to interrupt the machining process for a tool change, for example by moving the spindle assembly upwards from the working region into a tool changing region, so that the tool-changing device can exchange the machining tools there. This does not make for efficient, fast machining of workpieces.

SUMMARY OF THE INVENTION

The present invention is therefore based on the problem of providing a machine tool with high dynamics and fast workpiece machining, in particular with long "machining times".

To solve this problem, it is provided in a machine tool of the type referred to above that the first spindle assembly is guided on a first spindle assembly guide of the guide arrangement and the at least one second spindle assembly is guided on a second spindle assembly guide separate from the first spindle assembly guide of the guide arrangement, so that the spindle assemblies are movable independently of one another into a working region in which the workpieces are provided for workpiece machining by the work holding device and a tool changing region provided for changing machining tools on the working spindles.

In this context, it is a fundamental idea that the spindle assemblies are mounted on individual spindle assembly guides, for example linear guides, rotary guides or the like, so that at least one spindle assembly can machine workpieces while at least one other spindle assembly is involved in tool change, i.e. moved into the tool changing region. There is therefore always one of the spindle assemblies available for workpiece machining.

The separate spindle assembly guides facilitate a collision-free movement of the spindle assemblies, so that the spindles do not collide if, for example, one spindle assembly is machining workpieces while the other spindle assembly is moved towards the tool changing region or away therefrom towards the working region.

In the following description and in the embodiments illustrated in the drawing, two movable spindle assemblies are provided by way of example, but further, for example three or four, spindle assemblies can obviously be provided. It is also conceivable that one spindle assembly is fitted with only one working spindle, while two or more other spindle assemblies are multi-spindle spindle assemblies, i.e. have a plurality of working spindles.

An advantageous embodiment provides that the spindle assemblies can be moved towards the same tool changing side, so that tools are changed on a single, i.e. the same, tool changing side. The tool changing region for at least two spindle assemblies is therefore expediently provided on the single tool changing side adjacent to the working region, so that the at least two spindle assemblies are moved to the same tool changing side for tool change. On the tool changing side, there is then provided, for example, a tool magazine or an operator's station for an operator. The structure of the machine is therefore very space-saving and economical. It is, however, possible for at least one third further spindle assembly to be moved to another tool changing side for tool change. Two or more tool changing sides can therefore be provided for example, and in this case, it is advantageous if at least two spindle assemblies have a common tool changing region.

In principle, however, it is also possible that different tool changing regions are provided for the first and the at least one second spindle assembly although separate spindle assembly guides are provided. It is therefore possible that, for example, the first spindle assembly is moved to a first side and the other spindle assembly is moved to another, second, side for tool change.

It is preferred if at least one bulkhead or wall is provided between the tool changing region and the working region. Tools can therefore be changed away from the working region without, for example, coolants, chips or the like contaminating tool holders or the like at the working spindles.

However, a bulkhead is also advantageous between the working region and a loading and unloading region provided for exchanging the workpieces at the work holding device. This being so, the workpieces or the work holders are not contaminated, for example by coolants, lubricants or the like, in the loading and unloading process.

In the tool changing region, a tool magazine is preferably provided. In the tool magazine, machining tools are stored and are available to the respective working spindle for change. It is preferred if the tool magazine is equipped for simultaneously changing at least two machining tools. The number of the simultaneously changeable machining tools expediently corresponds to the number of working spindles of the respective spindle assembly where the machining tools are to be changed or replaced. This being so, all of the working spindles can preferably change machining tools simultaneously.

The tool magazine may, for example, be a circular magazine and/or a drum magazine and/or a chain magazine and/or a shelf magazine or a combination thereof. It is therefore possible, for example, to provide a tool magazine of a first type for the first spindle assembly, such as a circular magazine, while providing a tool magazine of a second type different from the first type, e.g. a shelf magazine, for the second spindle assembly or further spindle assemblies. It is, however, expedient if one and the same tool magazine is assigned to at least two and preferably to all of the spindle assemblies mobile by way of the spindle assembly guides.

The spindle assembly guides are expediently designed as linear guides. It is, however, conceivable that the first spindle assembly guide has a construction which differs from that of the spindle assembly guide of the second spindle assembly or further spindle assemblies, so that a linear guide and a rotary guide are provided, for example.

It is preferred if the first spindle assembly guide and the second spindle assembly guide have parallel guide or movement axes. The guide axes of at least one spindle assembly guide and expediently of all spindle assembly guides expediently are horizontal guide axes.

The working spindles of at least one of the spindle assemblies are expediently arranged side by side in a row direction. The row direction may be a horizontal or a vertical row direction. It is preferred if the row direction is parallel to a guide or movement axis of the respective first spindle assembly guide or of the at least one second spindle assembly guide.

At least two working spindles of a spindle assembly are expediently arranged horizontally next to one another or horizontally on top of one another. In at least one spindle assembly, however, working spindles arranged on top of one another and next to one another can be provided, for example.

In the working region, at least one stationary spindle assembly with at least one working spindle is expediently provided. The stationary spindle assembly can obviously have several working spindles.

The stationary working spindle(s) is (are), for example, suitable for providing special positioning mechanics, in particular for a fine adjustment of the machining tool relative to the workpiece to be machined. For example, a fine bore can be produced with the at least one stationary working spindle.

The first spindle assembly and/or the at least one second spindle assembly is/are expediently located in the working region below the at least one stationary spindle assembly. The respectively assigned spindle assembly guide can therefore be routed close to the floor or the underground, for example directly on a machine bed of the machine tool. In addition, the at least one stationary spindle assembly is readily accessible for a tool change; this will be explained in greater detail later.

A loading and unloading device for exchanging workpieces at the work holding device is preferably provided. The loading and unloading device can, for example, be represented by a working robot, or else by another loading and unloading unit which may be less flexible in application than a working robot.

The loading and unloading device expediently follows a positioning movement of a work holder of the work holding device while the workpiece is being machined by the respective machining tool and is designed for exchanging at least one workpiece not currently involved in machining at the work holder while another workpiece held by the work holder is being machine by at least one of the spindle assemblies, e.g. the first and/or the at least one second spindle assembly.

The loading and unloading device is expediently configured for engagement with the working region and for exchanging the machining tools at one or more working spindles in the working region, for example at the above-mentioned stationary spindle assembly or at least one stationary working spindle. The working robot can therefore, for example, directly enter the working region and there exchange machining tools at one or more working spindles. It may, for example, be provided that the loading and unloading device is designed for passing through a frame of the tool holding device to the working spindle where the machining tool is to be exchanged.

It is also expedient if the loading and unloading device is designed for placing the machining tools in a tool magazine, for removing them from a tool magazine or both. It is advantageous if the loading and unloading device is, in addition to exchanging workpieces, also configured for exchanging machining tools at the tool magazine referred to above. This means that the tool magazine can also be served by the loading and unloading device, for example by the working robot.

The guide arrangement expediently comprises a work holder guide for guiding the work holding device for positioning a work holder holding the workpieces relative to the respectively operating machining tools. This being so, the workpiece can be moved relative to the machining tool for the preferably chip removal-type machining process.

The work holder guide comprises, for example, one or more slides by means of which the work holder can be adjusted, for example in the Z-direction and/or in the Y-direction and/or in the X-direction.

At this point, it should be said that the positioning work can obviously be performed by the respective working spindle, in particular by the spindle assembly, as well. For example, the first and/or the at least one second spindle assembly can be positioned for workpiece machining using the spindle assembly guides. The spindle assemblies are expediently positioned in the X-direction, but they can also be positioned in the Z-direction and/or in the Y-direction and/or in the X-direction.

The work holder guide is expediently configured for guiding the work holder in at least one workpiece guide axis extending across, for example at a right angle to, the spindle assembly guide axes of the first spindle assembly guide and/or of the second spindle assembly guide of the at least one first or second spindle assembly.

A preferred embodiment, which is illustrated in greater detail in the drawing, provides that the spindle assembly guides of the first spindle assembly and of the at least one second spindle assembly are provided for linear adjustment parallel to a first spindle assembly guide axis. The first guide axis is a horizontal X-axis, for example.

The work holder guide is expediently configured for guiding the work holder parallel to a second guide axis extending at right angles to the first spindle assembly guide axis, for example a horizontal Z-axis. This being so, the respective spindle assembly can, for example, be moved in the X-direction, while the workpieces are guided by the work holding device in the direction of the spindle axes of the working spindles, i.e. in the Z-direction, by way of the work holder guide, for example a slide, and/or in the Y-direction.

In this context, it is expedient if the work holder can be traversed in the direction of a third guide axis as well, which advantageously extends vertically in the Y-direction. In any case, the third guide axis is expediently perpendicular to the first and second guide axes.

As mentioned above, the first spindle assembly guide and/or the second spindle assembly guide (or each further spindle assembly guide) facilitate(s) a positioning and/or an infeed movement of the respective spindle assembly to at least one workpiece to be machined.

The working spindles of at least one spindle assembly or of all spindle assemblies are expediently arranged stationary in the respective spindle housing. It is, however, also possible for at least one working spindle to be movable in the respective spindle housing, for example for an infeed movement to the respective workpiece to be machined.

The spindle assembly guides—in any case at least one spindle assembly guide—of the spindle assemblies are expediently mounted on a tower- or portal-type frame. It is also possible for the spindle assembly guides of two spindle assemblies to be mounted on separate frames. The term "frame" can in this context be understood, for example, as a type of machine bed or guide bed on which a spindle assembly guide is mounted. As a result, one spindle assembly guide can, for example, extend at a low level close to the machine bed, while another spindle assembly guide located above is mounted on a frame.

Owing to the flexible concept of the invention, the spindles of the first spindle assembly and the spindles of the at least one second spindle assembly can simultaneously be brought into machining engagement with the workpieces held by the work holding device. It is, however, also possible for the spindle assembly guides of the spindle assemblies to be spaced in such a way that, while workpieces are being machined by the one spindle assembly, the other spindle assembly can be moved past the work holder or the workpieces, for example for moving towards the tool changing region or from the tool changing region back into the working region.

In the machine tool, it is advantageously provided that it comprises a loading and unloading device, in particular a working robot, for exchanging workpieces at the work holding device, which loading and unloading device follows a positioning movement of the work holder while a workpiece is being machined by the respective machining tool, and which loading and unloading device is configured for exchanging at least one workpiece not being machined on the work holder while another workpiece held by the work holder is being machined by the first spindle assembly.

In this context, it is a fundamental idea that the workpiece exchange does not interfere with workpiece machining, i.e. that workpiece machining can continue while workpieces are exchanged at the work holder. Workpieces can therefore be machined at the same time as workpieces are exchanged, which makes the machine very fast.

To synchronise the motions of the work holding device and the loading and unloading device, a common control unit is advantageously provided for both components, i.e. the work holding device and the loading and unloading device. It is, however, also possible for two separate control units to control the work holding device and the loading and unloading device in a synchronised manner. For example, an advantageous embodiment of the invention provides a control unit for the work holding device indicated by broken lines and a control unit for the loading and unloading device, which is synchronised with the holder control unit. The two control units can communicate with one another via a bus, for example a field bus.

A control unit for both the loading and unloading device and the work holding device is expediently configured to execute a first control module and a second control module; these can be executed jointly on a processor of the control unit and communicate directly with one another, for example by way of a common storage area, using messages within the control computer or the like. The control modules are software modules, for example. However, an advantageous embodiment can also provide for only a single control module configured for controlling both the work holding device and the loading and unloading device, so that synchronous control is ensured by this feature alone.

The loading and unloading device or its control unit expediently comprises an input interface via which a position signal indicating the position of the work holding device can be received. The loading and unloading device is expediently configured to perform a superimposed positioning movement, with a second positioning movement being superimposed on a first positioning movement. The first positioning movement is used for exchanging workpieces at a stationary work holding device, which is common practice, while the second positioning movement simultaneously follows the movement of the work holding device. In principle, the loading and unloading device delivers both positioning movements in a superimposed manner, resulting in an easy flow of workpiece exchange.

In addition to the simultaneous control of the loading and unloading device and of the work holding device, which facilitates a quasi-simultaneous and in any case coordinated movement of the two components, the work holding device can have a position marking by way of which the loading and unloading device can follow the work holding device in a manner of speaking. The position marking may, for example, be a radio marking, an optical marking or the like. By means of a so-called triangulation, it is, for example, possible for the loading and unloading device to follow the work holding device. The term "follow" should, however, not be understood to mean that the loading and unloading device hobbles after the work holding device in a manner of speaking, but that a high accuracy and a simultaneous movement of the two components are ensured.

The loading and unloading device is expediently provided with a magazine holder for holding at least two workpieces, so that the loading and unloading device can simultaneously exchange at least two workpieces and preferably all workpieces assigned to simultaneous machining. If, for example, three working spindles are provided on a respective spindle assembly, three workpieces can be made available simultaneously by the work holder. The magazine holder then expediently facilitates the simultaneous exchange of three workpieces. The number three is given by way of example only and may, for example, be replaced by two, four or more.

On the work holding device, there is expediently provided at least one feed slant for feeding in the respective workpiece. It is also advantageous if a latching device for latching the respective workpiece to the work holding device is provided. Both measures contribute to balancing out any imprecision in the positioning of the loading and unloading device relative to the work holding device, and the loading and unloading device follows the machining process in a manner of speaking, following the movement of the work holding device.

It is advantageous if workpieces are exchanged in movement phases in which the work holding device moves slowly, so that the positioning task of the loading and unloading device is made easier. The control explained above, for example the common control module or the various control modules, is expediently designed such that slow movement phases are used for the effective exchange of workpieces, while the loading and unloading device is, for example, positioned away from the work holding device during faster movement phases or while it initially follows a support element of the work holding device before depositing at or removing from the support element workpieces during a subsequent slower movement phase.

It is preferred if the loading and unloading device is configured for moving the work holding device into a holding position provided for holding a workpiece and/or into a release position provided for releasing or removing a workpiece. The loading and unloading device therefore actively operates the work holding device, so that the latter moves, for example, into a clamping position or into a release position for facilitating the exchange of workpieces.

The loading and unloading device is expediently configured for positioning the workpieces in at least one further work station away from the work holding device. This work station can be used for deburring workpieces, for example. Alternatively, workpieces can be identified and/or measured at the further work station. This enables the loading and unloading device to perform further tasks, for example during times when no workpieces have to be exchanged at a work holding device.

The work holding device may, for example, comprise a so-called reversible twin-clamping mechanism. The work holders of this reversible twin-clamping mechanism are pivotably mounted on a frame with two arms, the two arms pivoting about a central pivot axis. At these arms, the work holders can pivot relative to the central pivot axis in the manner of planets. The work holding device can, for example, comprise a work holder with a plurality of work holding regions, the work holder being designed in the manner of a beam and pivoting about a pivot axis.

The machine tool according to the invention is expediently intended for chip removal from workpieces. The workpieces are preferably engine components, for example connecting rods, engine blocks or the like. The machining tools are expediently milling heads, drills, turning tools or the like.

BRIEF DESCRIPTION OF THE DRAWINGS

Embodiments of the invention are explained below with reference to the drawing, of which.

DETAILED DESCRIPTION OF THE
PREFERRED EMBODIMENTS

Figure 1:
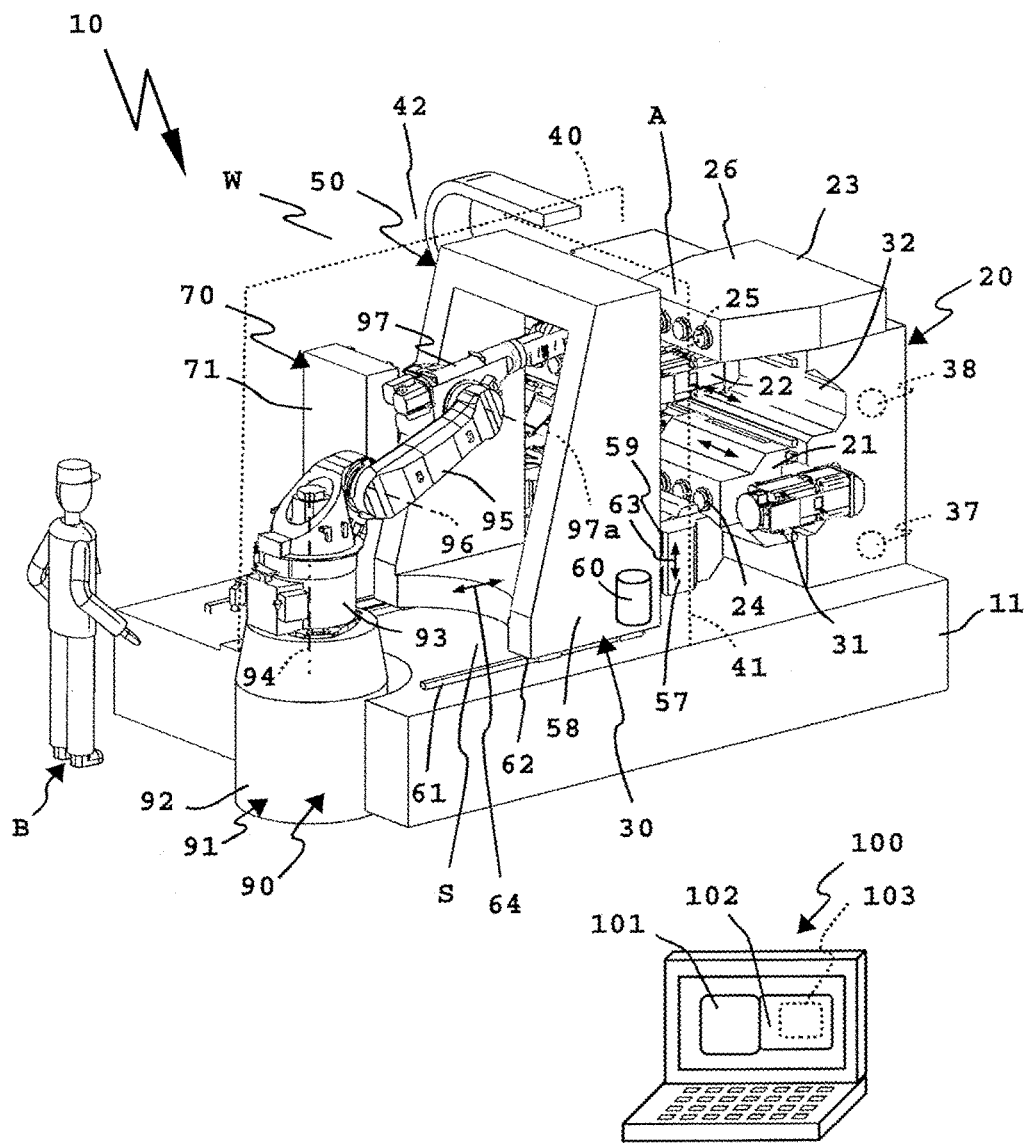
FIG. 1 is a perspective oblique view of a first machine tool according to the invention with a shelf magazine and a control unit.
Figure 3:
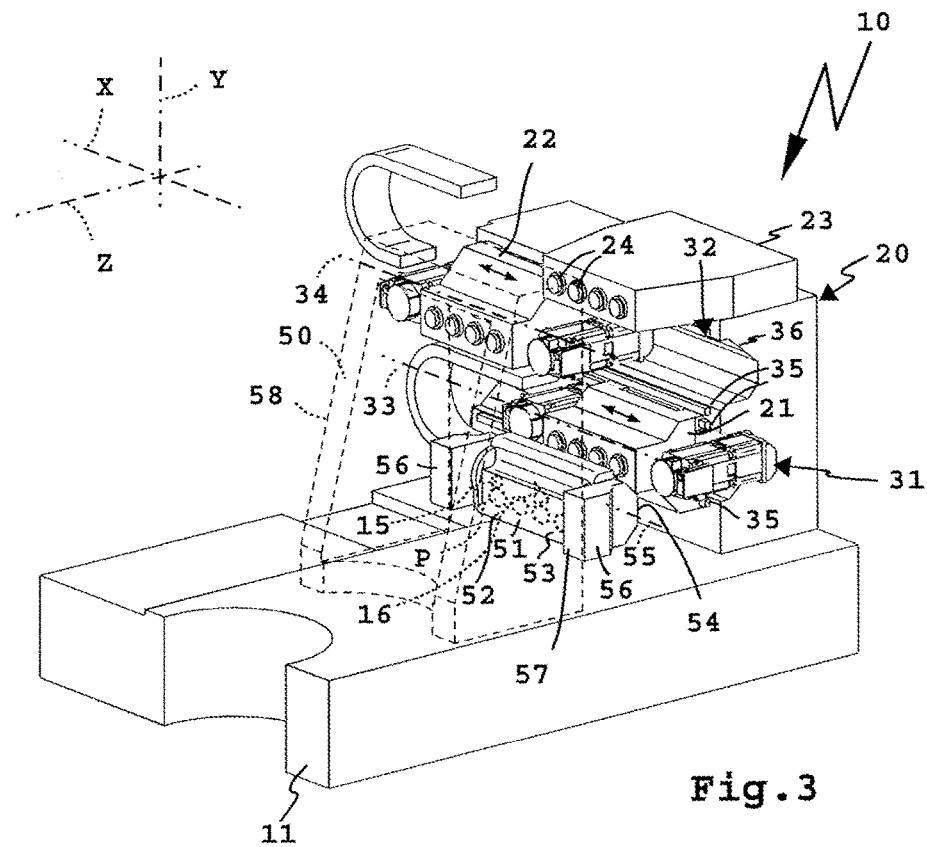
FIG. 3 shows the machine tool from FIG. 1, but illustrating details by partially removing components.
Figure 4:
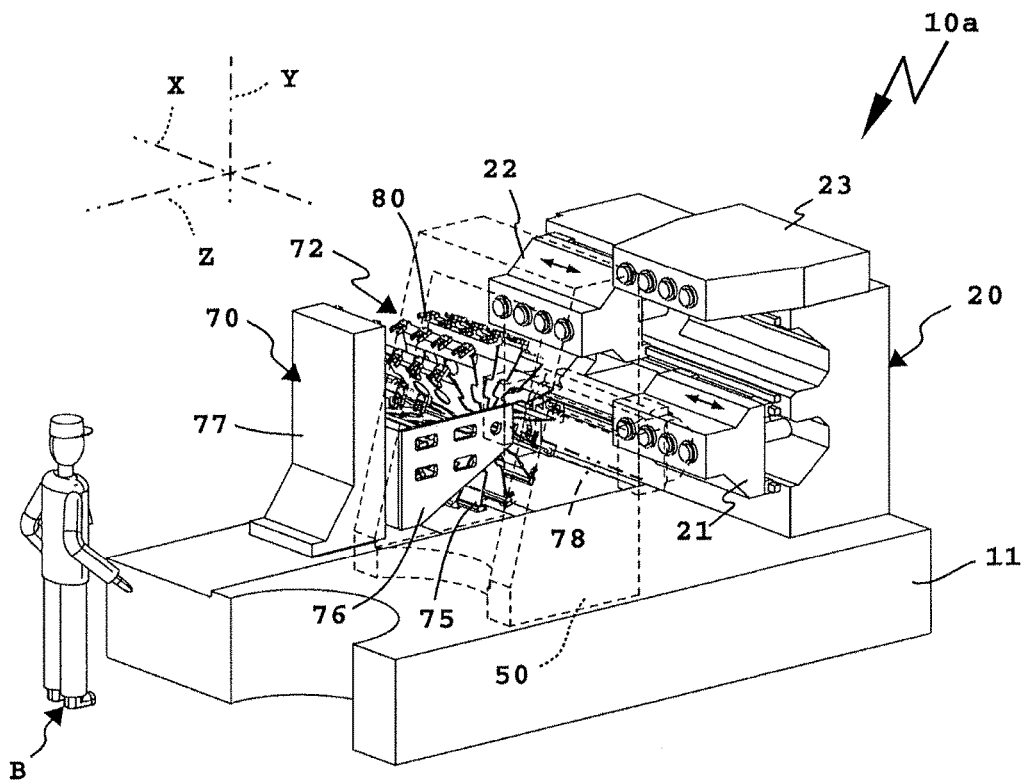
FIG. 4 shows a variant of the embodiment from FIG. 1, but with a drum magazine.
Figure 5:
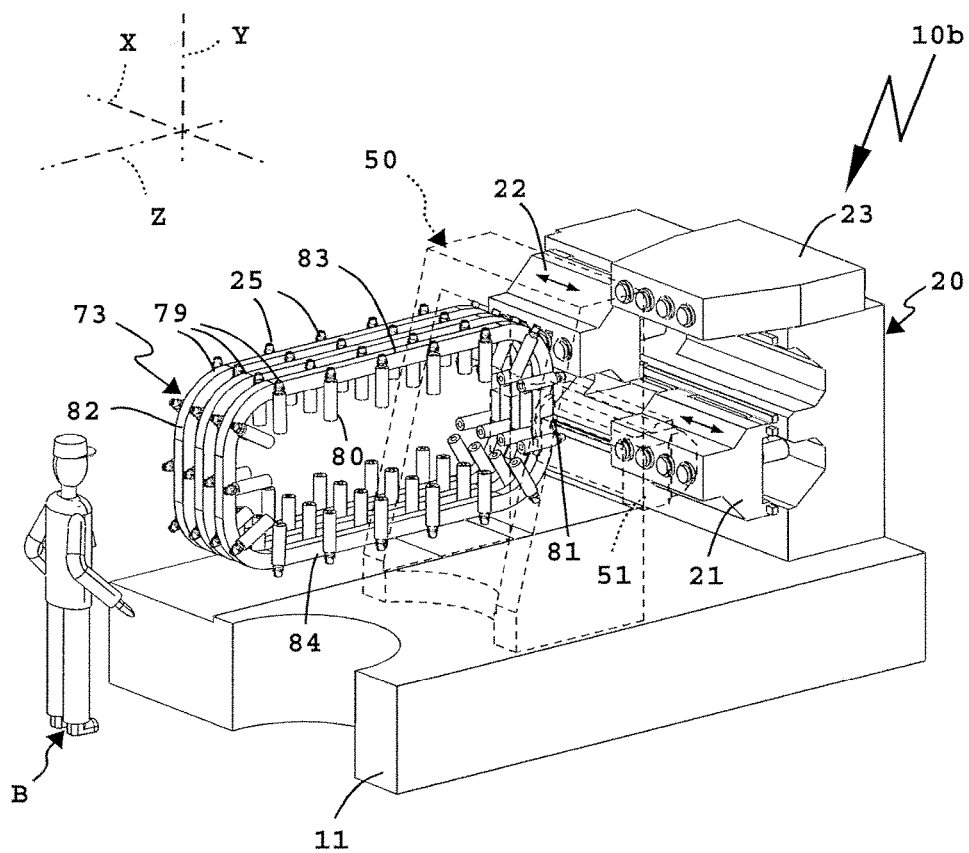
FIG. 5 shows a further variant of the embodiment from FIG. 1, but with a chain magazine.
Figure 6:
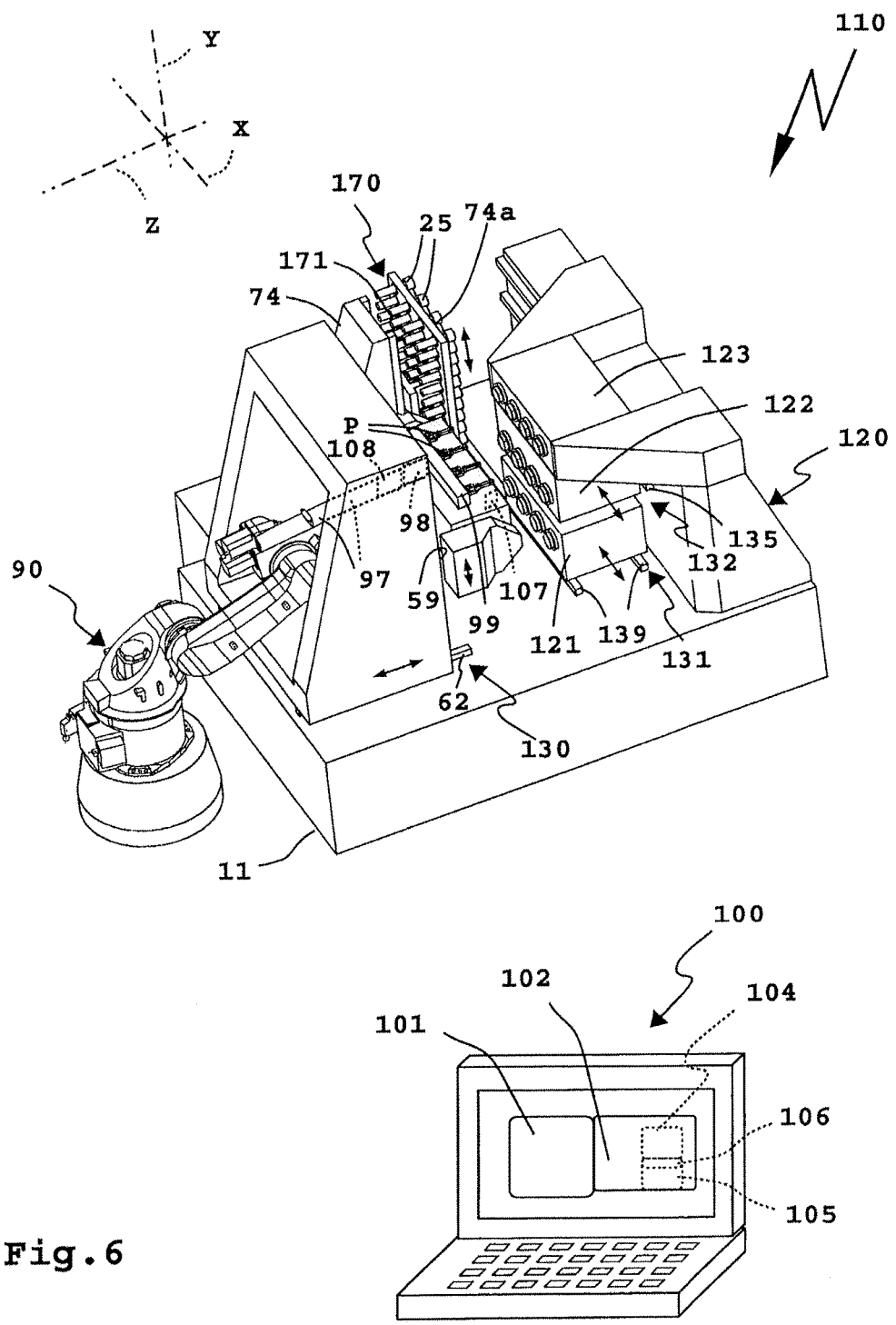
FIG. 6 shows a second embodiment of a machine tool according to the invention with an alternative spindle assembly guide arrangement.

In the following description, identical or similar components are partly identified by the same reference numbers. In the case of those variants of the machine tool from FIG. 1 which are shown in FIGS. 4 and 5, reference numbers with an added letter "a" or "b" are used on occasion, while the reference numbers for the embodiment according to FIG. 6 are increased by 100 compared to FIGS. 1 to 5. The variants mentioned in the context of the different embodiments can obviously be combined readily.

On a machine bed 11 of a machine tool 10, a frame 20 with a first spindle assembly 21, a second spindle assembly 22 and a third spindle assembly 23, each having a total of four working spindles 24, is mounted.

On the diagrammatically illustrated working spindles 24, machining tools 25, in particular drill heads, milling tools or the like, which are in particular provided for chip removal or a grinding operation, are releasably mounted. With these machining tools, workpieces P illustrated diagrammatically in FIG. 3 can be machined. The workpieces P may, for example, be connecting rods or other metal components. The machine tool 10 is obviously suitable for other workpieces as well, for example for engine blocks or the like. In this context, it should be stated that a machining of engine components is a preferred application of the invention.

The frame 20 is constructed in the manner of a tower.

The spindle assemblies 21 to 23 are arranged vertically on top of one another, i.e. in the direction of a Y-axis. The spindle assembly 21 is the bottom unit, the spindle assembly 22 the middle unit and the spindle assembly 23 is the top unit of the arrangement.

The working spindles 24 of the spindle assemblies 21 to 23 are in each case accommodated in a spindle housing 26.

The spindle assembly 23 is stationary in the working region A of the machine tool 10, which is provided for machining workpieces, while the two other spindle assemblies 21, 22 are mobile spindle assemblies in a manner of speaking, being movable between the working region A and a tool changing region W. In the tool changing region W, machining tools are exchanged, while the workpieces P are machined in the working region A. The tool changing region W is provided on a tool changing side 42 adjacent to the frame 20.

A guide arrangement 30 with a first spindle assembly guide 31 for the spindle assembly 21 and a second spindle assembly guide 32 for the spindle assembly 22 facilitate the movement of the spindle assemblies 21, 22 between the working region A and the tool changing region W.

The spindle assembly guides 31, 32 comprise guide rails 35, which extend in the direction of guide axes 33, 34 and on which the spindle housings 26 of the spindle assemblies 21, 22 are mounted for linear movement in the manner of slides. Linear guides 36 are thus implemented. The spindle housings 26 can obviously form slides themselves, but they can also be mounted on a slide.

The slides or spindle housings 26 of the spindle assemblies 21, 22 can be driven independently by drives 37, 38 and can therefore be moved independently along the guide axes 33, 34. The drives 37, 38 are electric motors and/or fluidic, e.g. pneumatic or hydraulic, drives, for example.

The guide axes 33, 34, which can also be described as movement axes, extend parallel to an X-direction, i.e. in the X-direction in a manner of speaking.

The working spindles 24 of each spindle assembly 21, 22, 23 are arranged in a row direction 27 adjacent to one another in the same way as the guide rails 33, 34, i.e. in the direction of the X-axis.

The spindle assemblies 21, 22, 23 have a quasi-flat configuration and can therefore be arranged indirectly on top of one another at a small distance in the direction of the Y-axis.

The working region A and the tool changing region W are, for example, separated from one another by a bulkhead 40, so that any chips, coolant or the like found in the working region A cannot enter the tool changing region W.

A further bulkhead 41, which is also indicated diagrammatically, is provided between the working region A and a loading and unloading region S provided for exchanging workpieces P.

The bulkheads 40, 41 can obviously be multi-part units and comprise one or more movable components. The bulkhead 40 can have one or more openings, enabling the spindle assemblies 21, 22 to be moved from the working region A to the tool changing region W and vice versa.

The bulkhead 41 can likewise have one or more openings. In any case, the bulkhead 41 allows a work holding device 50 to be movable.

The work holding device 50 comprises a work holder 51, for example. The work holder 51 comprises a beam-type holding body 52 with a plurality of work holding regions 53, 54 (or further work holding regions), which are arranged at an angle to one another. The holding body 52 is mounted on bearing blocks 56 for pivoting about a pivot axis 55. The bearing blocks 56, together with the holding body 52, in their turn form a slide 57, which is movably mounted on a frame-like base 58 of the work holding device 50, being movable in a Y-direction.

At a front side of the frame 58, which faces the frame 20, there may, for example, be guide rails of a work holder guide 59, which facilitate a movement of the work holder 51 in the Y-direction. A diagrammatically indicated drive 60 drives the slide 57. The work holder guide 59 is a linear guide.

The frame 58 is likewise mounted for linear movement on guide rails 61 of a work holder guide 62, moving not in the Y-direction, however, but in the direction of a Z-axis. The frame 58 can therefore move the work holder 51 in the manner of a slide towards the working spindles 24 and away therefrom along the Z-axis, for example in order to produce bores.

The work holder guides 59, 62 guide the work holder 51 in the direction of a first workpiece guide axis 63 and a second workpiece guide axis 64.

The other slide 57 facilitates the movement of the work holder 51 in the direction of the Y-axis, so that the work holder 51 can be positioned relative to the spindle assembly 21, 22, 23 involved in the machining process. The spacing of these spindle assemblies 21, 22, 23 in the Y-direction is preferably dimensioned such that the spindle assembly 21, for example, can be moved from the working region A into the tool changing region W without impediment, while the work holder 51 stands in front of the spindle assembly 22 or 23. It is, however, also possible to choose a smaller spacing in the Y-direction, for example between the spindle assemblies 22 and 23, so that the working spindles 24 of two spindle assemblies 21 and 22 or 22 and 23 can machine workpieces P simultaneously if they are made available frontally by the work holder 51.

For positioning workpieces P relative to the machining working spindles 24, the guide arrangement 30 comprises both the spindle assembly guides 31, 32 and the work holder guides 59, 62. All guides are linear guides, but it is possible for one or more guides to be designed as rotary guides, so that workpieces P and/or working spindles 24 are pivoted for machining, for example. It is, for example, possible for the work holder 51 to be pivoted about the pivot axis 55 in the machining process.

In the tool changing region, a tool magazine 70, 170, for example a shelf magazine 71 (FIGS. 1 and 2) or a shelf magazine 171 as in the machine tool 110 shown in FIG. 6, is expediently provided.

The machine tool 10a, on the other hand, is provided with a drum magazine 72, while the machine tool 10b has a chain magazine 73.

All tool magazines 70, 170 allow the simultaneous exchange of several machining tools 25 at the spindle assembly 21, 22 presently located in the tool changing region W. The machining tools 25 made available at any one time are arranged side by side in the row direction 27.

A holder 74a of the shelf magazine 71, 171 may, for example, have several tiers, in each of which are located four machining tools 25 arranged side by side in the row direction 27. The holder 74a of the shelf magazine is, for example, guided on a stand 74 for linear movement in the Y-direction and can be positioned by a drive not shown in the drawing for bringing the currently required row of machining tools 25 into position in front of the respective spindle assembly 21, 22.

In the drum magazine 72, a drum 75 is movable in the Y-direction by means of a slide 76 on a stand 77. On its outer circumference, parallel to its axis of rotation 78, about which it is mounted to rotate on the stand 77, the drum 75 is provided with several rows of tool holders 80 for machining tools 25. By rotating about the axis of rotation 78, a suitable row of tool holders 80 or machining tools 25 respectively can be brought into position in front of the spindle assembly 21 or 22, while the slide 76 adopts the suitable Y-position. For simplicity, the drives for the drum 75 and the slide 76 are not shown.

The chain magazine 73 comprises several chain runs 79, for example 3 or 4 (corresponding to the number of working spindles 24 of the respective spindle assembly 21). The chain runs 79 support tool holders 80 for holding machining tools 25.

The chain runs 79 or the tool holders 80 mounted thereon are arranged side by side in the row direction 27, so that 4 tool holders 80 can be in position in front of the spindle assembly 21 and the spindle assembly 22 whenever these spindle assemblies 21, 22 are in the tool changing region W. On any one chain run 79, 2 tool holders 80 can, for example, be arranged in the row direction 27.

The chain runs 79 are advantageously arranged in such a way that a front section 81 of the run extends in the tool changing region W in front of the respective spindle assemblies 21, 22 or in front of the section of the spindle assembly guides 31, 32 which extends into the tool changing region W, while a rear section 82 of the run is easily accessible, for example for an operator B or a loading and unloading device 90. Between the sections 81, 82, there are sections 83, 84, which extend along or parallel to the Z-axis, for example.

With the various tool magazines 70, 170, it is therefore possible for the spindle assembly 21, 22 which is currently in the tool changing region W to deposit all machining tools 25 simultaneously in free tool holders 80 and to pick up another group of machining tools 25. This process is very fast and effective. In this context, it has to be noted that, during the tool change, the respective other spindle assembly 21, 22 continues the machining process in the working region A, allowing for uninterrupted operation.

The handling and the optimised fast machining process are improved further by the efficiently operating loading and unloading device 90 described below.

The machine tool 10, 110 is equipped with a working robot 91, which is provided for exchanging the workpieces P at the work holding device 50 and forms the loading and unloading device 90. The loading and unloading device 90, however, exchanges workpieces P not only while the machine tool 10, 110 is stopped, i.e. while the work holder 51 is stationary, but also while the latter moves relative to the frame 20, for example along the tool holder guide 59 and/or 62 during the machining process. The working robot 91 follows this movement.

The working robot 91 comprises a pedestal 92, for example, on which a base 93 is mounted for rotation about an axis 94. From the base 93, an arm 95 extends, which is in turn mounted on the base 93 for pivoting about a further axis 96. The arm 95 in turn supports a further arm 97 for pivoting about an axis 97a. This being so, a gripping element 98 mounted at the front of the arm 97 is largely capable of free movement in three dimensions. The working robot 91 may, for example, be a so-called articulated arm robot.

The gripping element 98 supports a magazine holder 99, for example, by means of which the working robot 91 or the loading and unloading device 90 can simultaneously pick up and/or deposit several workpieces P, for example 4.

A control unit 100, for example with a processor 101, is configured for the control of the loading and unloading device 90 and the work holding device 50. Suitable control lines (not shown) are, for example, provided between the control unit 100 and the loading and unloading device 90 as well as the work holding device 50. The control unit 100 further comprises a memory 102, in which a control module 103 is stored. The control module 103 is a programme module with a programme code executable by the processor 101. By executing the control module 103, the control unit 100 controls the loading and unloading device 90 and the work holding device 50 simultaneously in such a way that the work holding device 50 positions the workpieces P relative to the working spindles 24 for machining while the working robot 91 simultaneously follows this movement and exchanges workpieces P which are, for example, in the work holding region 53 or 54 and not pivoted into the working region A.

In addition, the loading and unloading device 90 is multi-functional insofar as it can, for example, place machining tools 25 in the tool magazine 70 or remove them when no workpiece exchange is imminent and/or the machine tool 10 has a break.

Figure 2:
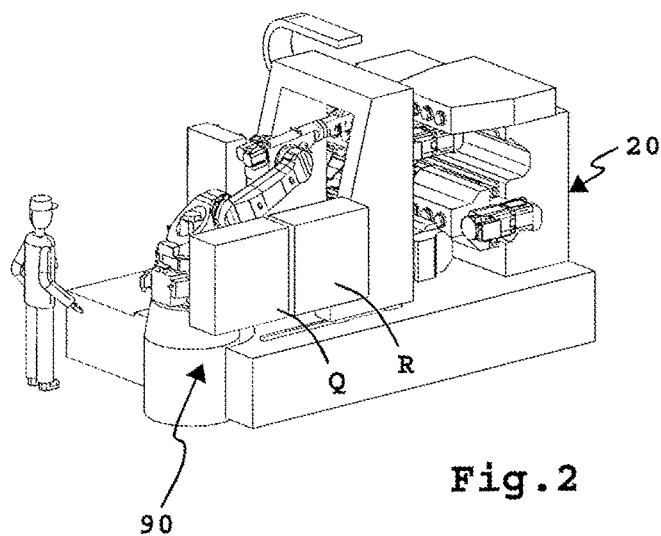
FIG. 2 shows the machine tool from FIG. 1, but with two further work stations served by a loading an unloading device in the form of a working robot.

By way of example, FIG. 2 shows 2 further work stations Q and R, where the workpieces P can be deburred and measured, for example. The working robot 91 can, for example, initially remove the workpieces P from the work holder 51 and then successively deposit them at the work stations Q and R for further processing.

In the concept of the machine tool 110 according to FIG. 6, components matching the above description are drawn and indicated using the same reference numbers.

On the top of a frame 120 of the machine tool 110, a stationary spindle assembly 123 is provided, below which is located a spindle assembly 122, which can be moved along a spindle assembly guide 132 between the working region A and the workpiece changing region W in the direction of the X-axis. Below the spindle assembly 122, there is a further mobile spindle assembly 121, which is likewise movable in the direction of the X-axis between the working region A and the workpiece changing region W. Like the spindle assemblies 21 and 22, the spindle assemblies 121 and 122 can therefore be moved between the working region A and the workpiece changing region W for machining or for the exchange of workpieces.

There is, however, a difference in that the guide rails 135 of the spindle assembly guide 132 are directly mounted on the frame 120, for example at the front facing the work holding device 50, while the guide rails 139 of the spindle assembly guide 131 are mounted below on the machine bed 11. The guide elements of the spindle assembly guides 131, 132 are therefore not placed on one and the same base.

FIG. 6 further shows that the mobility of the working robot 91 is designed such that it can project or grip as far as the working spindles 24 of the stationary spindle assembly 23, 123. Its gripping element 98 can, for example, remove machining tools 25 from these stationary working spindles 24 and exchange them against other machining tools 25. The gripping element 98 can, for example, deposit the machining tools 25 in one of the tool magazines 70, 170 or pick them up from there. This provides a further function for the loading and unloading device 90.

A further control concept for the loading and unloading device 90, which makes it follow the positioning movements of the work holding device 50, is indicated in the context of FIG. 6.

In this embodiment, the control unit 100 comprises a first control module 104 for the control of the work holding device 50 and a second control module 105 for the control of the loading and unloading device 90, both of which are directly executed by the processor 101. A particularly simple aspect of this concept is that the control modules 104, 105 directly communicate with one another, for example for matching the movement of the loading and unloading device 90 to that of the work holding device 50. The control module 105, for example, is provided with an input interface 106, via which the control module 105 receives from the control module 104 position messages relating to imminent or current positioning movements of the work holding device 50.

A further variant can provide that, for example on the work holder 51, a position marking 107 is provided, which is detected by a locating device 108 on the loading and unloading device 90. The locating device 108 comprises, for example, at least one radio receiver, a camera or other receiving elements designed for radio-based or optical location. Using the position marking 107, the loading and unloading device 90, for example the control module 105, can detect the current position of the work holder 51 and therefore simultaneously track the position of the gripping element 98 or the magazine holder 99 respectively.

The locating device 108 and the position marking 107 are also advantageous for the implementation of a safety concept, i.e. using these components, the control module 103 or 104 checks whether the loading and unloading device 90 is optimally positioned relative to the work holding device 50.

This positioning can obviously be subject to certain tolerances. In this case, it is advantageous if a latching device 15 and/or a feed slant device 16 is/are provided in the tool holding regions 53, 54 on the diagrammatically illustrated work holders, which may, for example, include clamping jaws, a clamping face or the like.

The invention claimed is:

1. A machine tool for machining workpieces, wherein the machine tool comprises:
    a first spindle assembly having a first common spindle housing and at least two working spindles arranged in the first common spindle housing, each working spindle having a machining tool for workpiece machining;
    a second spindle assembly having a second common spindle housing and at least two working spindles arranged in the second common spindle housing, each working spindle having a machining tool for workpiece machining;
    a work holding device for holding workpieces for workpiece machining by means of the machining tools; and a guide arrangement for the relative positioning of the work holding device holding the workpieces and of the first spindle assembly and the second spindle assembly for workpiece machining, wherein the guide arrangement comprises:

a first spindle assembly guide rail extending in a linear x-direction for supporting and guiding the first spindle assembly, the first spindle assembly being movable on the first spindle assembly guide rail in the x-direction;

a second spindle assembly guide rail extending in the x-direction and spaced from the first spindle assembly guide rail in a linear y-direction perpendicular to the x-direction for supporting and guiding the second spindle assembly, the second spindle assembly being movable on the second spindle assembly guide rail in the x-direction parallel with the movement of the first spindle assembly, the second spindle assembly guide rail being separate from the first spindle assembly guide rail of the guide arrangement so that the first spindle assembly is not movable on the second spindle assembly guide rail, and so that the spindle assemblies are movable independently of one another into a working region, in which the workpieces are machined, and into a tool changing region, in which machining tools of the working spindles are changed;

a first work holding device guide rail extending in a linear z-direction perpendicular to the x-direction and perpendicular to the y-direction for supporting and guiding the work holding device in the z-direction toward and away from the first spindle assembly and the second spindle assembly; and a second work holding device guide rail extending in the y-direction for guiding the work holding device in the y-direction between the first spindle assembly and the second spindle assembly.

2. A machine tool according to claim 1, wherein the tool changing region is provided on a single tool changing side of the machine tool adjacent to the working region, so that the first spindle assembly and the second spindle assembly are movable in the x-direction to the single tool changing side for tool change.

3. A machine tool according to claim 1, wherein a bulkhead is provided between the tool changing region and the working region and/or between the working region and a loading and unloading region in which the workpieces at the work holding device are exchanged.

4. A machine tool according to claim 1, wherein a tool magazine is provided in the tool changing region, the tool magazine being equipped and provided for simultaneously exchanging at least two of the machining tools.

5. A machine tool according to claim 1, wherein the working spindles of the first spindle assembly are arranged side by side in a first row that extends in the x-direction, and wherein the working spindles of the second spindle assembly are arranged side by side in a second row that extends in the x-direction.

6. A machine tool according to claim 5, wherein the first spindle assembly comprises at least three working spindles arranged side by side in the first row that extends in the x-direction, and wherein the second spindle assembly comprises at least three working spindles arranged side by side in the second row that extends in the x-direction, the first and second rows defining a plane extending in the x-direction and the y-direction.

7. A machine tool according to claim 6, wherein the at least three spindles of the first spindle assembly are movable in the x-direction along a first line defined by the first row, and wherein the at least three spindles of the second spindle assembly are movable in the x-direction along a second line defined by the second row.

8. A machine tool according to claim 1, wherein the x-direction is oriented horizontally.

9. A machine tool according to claim 1, further comprising at least one stationary spindle assembly, the at least one stationary spindle assembly having at least one working spindle provided in the working region.

10. A machine tool according to claim 9, wherein the first spindle assembly and the second spindle assembly are located in the working region below and spaced in the y-direction from the at least one stationary spindle assembly.

11. A machine tool according to claim 1, further comprising a loading and unloading device, which comprises a working robot for exchanging workpieces at the work holding device.

12. A machine tool according to claim 11, wherein the loading and unloading device follows a positioning movement of a work holder of the work holding device while workpieces are machined and wherein the loading and unloading device is configured for exchanging at least one workpiece on the work holder while another workpiece held by the work holder is being machined by at least one of the spindle assemblies.

13. A machine tool according to claim 11, wherein the loading and unloading device is, in addition to exchanging workpieces, also configured for exchanging machining tools at a tool magazine and/or at the first spindle assembly and/or at the second spindle assembly, and wherein the loading and unloading device is located in a stationary manner in the working region for passing through a frame for the work holding device.

14. A machine tool according to claim 1, wherein the first spindle assembly guide rail and the second spindle assembly guide rail are provided for a positioning and an infeed movement of the respective spindle assembly to at least one workpiece to be machined.

15. A machine tool according to claim 1, wherein the working spindles of at least one of the spindle assemblies or of all spindle assemblies are located in the respective spindle housing in a stationary or movable manner.

16. A machine tool according to claim 1, wherein the first and second spindle assembly guide rails are mounted on a tower- or portal-type frame of the machine tool.

17. A machine tool according to claim 1, wherein the working spindles of the first spindle assembly and the working spindles of the second spindle assembly can simultaneously be brought into machining engagement with the workpieces held by the work holding device, and/or wherein the first and second spindle assembly guide rails are spaced in such a way that, while workpieces are being machined by one of the first and second spindle assemblies, the other of the first and second spindle assemblies can be moved past the work holding device.

18. A machine tool for machining workpieces, wherein the machine tool comprises:

a first spindle assembly having a first common spindle housing and at least three working spindles arranged in a first row extending in a linear x-direction in the first common spindle housing, each working spindle having a machining tool for workpiece machining;

a second spindle assembly having a second common spindle housing and at least three working spindles arranged in a second row extending in the linear x-direction in the second common spindle housing, each working spindle having a machining tool for workpiece machining;

a work holding device for holding workpieces for workpiece machining by means of the machining tools;

a tool magazine; and a guide arrangement for the relative positioning of the work holding device holding the workpieces and of the first spindle assembly and the second spindle assembly for workpiece machining, wherein the guide arrangement comprises:
- a first spindle assembly guide rail extending in the linear x-direction for supporting and guiding the first spindle assembly, the first spindle assembly being movable on the first spindle assembly guide rail in the x-direction;
- a second spindle assembly guide rail extending in the x-direction and spaced from the first spindle assembly guide rail in a linear y-direction perpendicular to the x-direction for supporting and guiding the second spindle assembly, the second spindle assembly being movable on the second spindle assembly guide rail in the x-direction parallel with the movement of the first spindle assembly, the second spindle assembly guide rail being separate from the first spindle assembly guide rail of the guide arrangement so that the first spindle assembly is not movable on the second spindle assembly guide rail, and so that the spindle assemblies are movable independently of one another into a working region, in which the workpieces are machined, and into a tool changing region, in which machining tools of the working spindles are exchanged between the working spindles and the tool magazine; and
- a work holding device guide rail extending in a linear z-direction perpendicular to the x-direction and perpendicular to the y-direction for supporting and guiding the work holding device in the z-direction toward and away from the first spindle assembly and the second spindle assembly.

* * * * *